United States Patent [19]
Birckhead, Jr.

[11] 3,970,035
[45] July 20, 1976

[54] POWDER DEPOSITION SYSTEM

[75] Inventor: Lennox Birckhead, Jr., Rowayton, Conn.

[73] Assignee: Vitek Research Corporation, Stamford, Conn.

[22] Filed: Nov. 20, 1973

[21] Appl. No.: 417,633

Related U.S. Application Data

[62] Division of Ser. No. 210,723, Dec. 22, 1971, Pat. No. 3,777,874.

[52] U.S. Cl. .................................. 118/7; 118/312; 118/323; 118/603; 118/634; 425/92; 425/223; 425/224
[51] Int. Cl.² ........................................... B05C 5/00
[58] Field of Search .................. 118/9, 7, 312, 308, 118/309, 326, 323, 634, 603; 51/12; 222/52; 425/96, 92, 103, 223, 224

[56] References Cited
UNITED STATES PATENTS

| | | | |
|---|---|---|---|
| 2,003,778 | 6/1935 | Willis | 118/323 X |
| 2,770,212 | 11/1956 | Marantz | 118/312 X |
| 3,073,070 | 1/1963 | Mead | 51/12 X |
| 3,139,044 | 6/1964 | Cole | 118/603 |
| 3,149,650 | 9/1964 | Horst | 222/52 X |
| 3,362,109 | 1/1968 | Wallace | 118/312 X |
| 3,724,416 | 4/1973 | Diamond et al. | 118/634 X |

*Primary Examiner*—John P. McIntosh
*Attorney, Agent, or Firm*—Weiser, Stapler & Spivak

[57] ABSTRACT

Apparatus and method for electrostatically depositing a layer of particulate material on a substrate surface from a gaseous suspension of particulate, thermoplastic material. Classifying means removes oversized particles from a supply of particulate, thermoplastic material and feeds properly-sized particulate material to a metering feed device. A pressure responsive sensing means is associated with the metering feed device, and energizes a control circuit associated with the classifying means to direct properly-sized particulate material from the classifying means into the metering feed device to maintain a substantially constant, predetermined amount of properly-sized particulate material in the metering feed device. The metering feed device feeds the properly-sized particulate material at a controlled volumetric rate into a gaseous medium to form a gaseous suspension of properly-sized particulate, thermoplastic material which is directed through a plurality of electrically charged spray means onto a substrate surface. The metering feed device includes a housing having a hopper section for receiving particulate material from the classifying means, and an elongate trough section in communication with the hopper section through a gate means. The trough section is divided into separate elongate channels by elongate, transversely spaced partition means which extend for substantially the entire elongate extent of the trough section. Each spray means includes a spray nozzle having an elongate passage terminating at a downstream end in an exit orifice, and a deflector fan positioned downstream of, and in overlying relationship with the exit orifice. Each spray nozzle has an inlet port in a side wall, and an elongate, tapered baffle overlies the inlet port for mixing a gaseous suspension of particulate material entering the spray nozzles through a conduit which is in communication with the inlet port of the spray nozzle and one channel of the metering feed device. Each spray nozzle further includes a discharge outlet chamber downstream of the baffle to confine the flow pattern of the gaseous suspension of particulate material as the gaseous suspension travels through the discharge outlet chamber and out of the exit orifice. The deflector fan associated with each spray nozzle deflects the gaseous suspension of particulate material onto the substrate surface in an elliptical pattern having its major axis disposed substantially transverse to the direction of elongation of the elongate passage. The spray nozzles are mounted on a belt which is movable along a path defining a closed loop having spaced, linear runs which traverse past the substrate surface upon which a layer of particulate material is to be formed. The metering feed device is supported on a rotatable platform, and drive means rotates the belt supporting the metering feed device at a synchronized speed to prevent twisting of delivery conduits which are in communication with the metering feed device and the spray nozzles.

3 Claims, 11 Drawing Figures

POWDER DEPOSITION SYSTEM

RELATED APPLICATIONS

This application is a division of U.S. patent application Ser. No. 210,723, filed Dec. 22, 1971, entitled POWDER DEPOSITION SYSTEM, now U.S. Pat. No. 3,777,874.

BACKGROUND OF THE INVENTION

1. Field of the Invention

This invention relates to apparatus and method for forming a particulate layer on a substrate surface from a gaseous suspension of particulate, thermoplastic material, and more particularly to apparatus and method utilizing electrostatics for forming a particulate layer on a substrate surface.

2. Description of the Prior Art

Considerable interest exists in electrostatic powder deposition systems for forming a particulate layer on a substrate surface from a gaseous suspension of particulate, thermoplastic material. These systems are being considered for use in forming many different types of layers on various types of substrates. For example, these systems are being considered for use in forming continuous webs of various thicknesses on a continuous substrate, such as a release paper substrate. One suitable release paper substrate is sold under the trademark "Transkote" by S. D. Warren Company, a division of Scott Paper Company. When the substrate is release paper the electrostatically deposited layer of particulate, thermoplastic material is fused to form a self-supporting continuous and uniform web which is removed from the substrate. Such a self-supporting web has many uses; for example, as a substitute for leather in products such as shoe uppers, upholstery and the like.

The substrate can be a discrete metal mold, or other suitable mold known in the art, having a cavity or cavities which conform to the configuration of a discrete article to be formed. For example, bottles, cartons, food trays, containers, and the like can be formed directly in such a discrete mold.

The substrate can also be a discrete article of manufacture such as a pipe, tube, tool handle and the like upon which a protective layer of fused, particulate material is required. The fused particulate layer is not removed from a discrete article when it is intended to function as a protective layer.

In most applications in which a layer of particulate material is formed on a substrate surface it is an important objective that the layer be substantially uniform and continuous. The prior art methods and apparatus have not been entirely satisfactory in accomplishing this objective.

Several types of feed systems have been utilized to feed an air suspension of particulate, thermoplastic material to spray means through which the air suspension of particulate material is directed onto a substrate surface. For example, an air suspension of particulate material has been contained in a reservoir and fed through a metering control valve to spray nozzles for coating pipes, as disclosed in U.S. Pat. No. 3,439,649, issued to Probst et al. Also, particulate material has been directed to spray nozzles through vibratory feeders, as disclosed in U.S. Pat. No. 3,155,545, issued to Rocks et al; and from fluidized beds, as indicated in U.S. Pat. No. 3,498,540, issued to Adams. The above feed systems have not been entirely satisfactory in directing a substantially constant volume of properly-sized particulate material to spray nozzles to aid in the formation of a substantially uniform and continuous layer of particulate material on a substrate surface.

Many types of spray nozzles have been utilized in directing a gaseous suspension of particulate, thermoplastic material onto a substrate surface, as exemplified in U.S. Pat. Nos. 3,521,815 issued to Szasz; 3,498,540, issued to Adams; 3,476,319, issued to Thatcher and 3,155,545, issued to Rocks et al. These prior art spray nozzles have not been entirely satisfactory in creating and maintaining a substantially uniform concentration of the particulate material in the gaseous suspension as said suspension is directed through said spray nozzles onto a substrate surface. Specifically, these prior art spray nozzles have not provided sufficient mixing of the gaseous suspension of particulate material to create a substantially uniform concentration of said particulate material in the gaseous medium for deposition onto a substrate surface.

Prior art apparatus for applying layers of particulate material on a substrate have included various types of feeding mechanism for depositing the particulate material on a substrate. These feeding mechanisms include hopper-type feeders, as is exemplified in U.S. Pat. No. 3,168,603, issued to Seefluth; shaking devices, as exemplified in U.S. Pat. No. 3,192,294, issued to Streed et al; and stationary spray nozzles, as exemplified in U.S. Pat. No. 3,155,545, issued to Rocks et al and U.S. Pat. No. 3,355,309, issued to Bender et al. These prior art arrangements for applying particulate material have not been satisfactorily employed in forming particulate layers on extensive substrate surfaces, such as long panels and continuous substrate surfaces. These prior art arrangements for directing particulate material onto extensive substrate surfaces have required extremely slow formation speeds in order to supply a sufficient quantity of particulate material over the entire surface of an extensive substrate.

The use of a plurality of spray guns for coating an extensive work piece has been suggested in U.S. Pat. No. 3,402,697, issued to Kock. The Kock patent primarily is directed to forming a coating of paint, for example, on an extensive surface area, and suggests that the plurality of spray guns be mounted on a reciprocating support. At high coating speeds, this reciprocating support must be reciprocated at a relatively fast frequency, and the instantaneous change in direction of reciprocation may adversely affect the formation of a substantial uniform coating on said substrate surface.

U.S. Pat. No. 2,718,477 issued to Miller, suggests the coating of an extensive web of liquid atomization in which a flexible discharge member, such as a continuous sheet metal belt, has its opposite, substantially flat surfaces coated by stationary spray nozzles with the liquid material to be applied to the web. This arrangement could not be satisfactorily utilized in an apparatus in which an air suspension of particulate material, as opposed to a liquid suspension of material, is to be applied to an extensive substrate surface because the air suspension of particulate material would not adhere to the surfaces of the belt in the manner disclosed in the Miller patent.

SUMMARY OF THE INVENTION

Applicant has discovered that one major cause of discontinuities in fused layers of particulate, thermoplastic material on a substrate surface is the creation of craters knocked in the particulate layer by projectiles consisting of oversized particles, or agglomerates of the particulate material directed onto the substrate surface through spray means. Applicant has discovered that after a uniform dense deposit of particulate material is applied to a substrate surface, an oversized particle, or agglomeration of particles, arriving at said surface can hit the surface and bounce away to thereby leave a crater. When the particulate material is fused, the surface tension of the softened particulate material pulls material away from the center of the crater thereby creating a discontinuity, in the form of a hole, in the layer. In the prior art methods and apparatus for forming particulate layers on a substrate surface from a gaseous suspension of particulate, thermoplastic material, the feed systems for directing the particulate material in a gaseous suspension through the spray nozzles have not proven satisfactory in eliminating the creation of oversized particles which cause such craters, and therefore have not proved satisfactory in preventing the creation of discontinuities in a fused, particulate layer, as set forth above.

One aspect of applicant's invention is a unique feeding system in an apparatus for forming a particulate layer from a gaseous suspension of particulate, thermoplastic material. The feeding system of applicant's invention includes a classifying means, a metering feed device, a control circuit and a pressure responsive sensing means. The classifying means removes from a supply of particulate, thermoplastic material substantially all particulate material above a predetermined size which will inhibit the formation of a substantially continuous and uniform layer of particulate material on a substrate surface, and directs properly-sized particulate material to the metering feed device. The metering feed device includes an upstream hopper section and a downstream trough section and feeds properly-sized particulate material at a controlled volumetric rate to delivery conduit means associated with the metering feed device and at least one spray means. The control circuit, when energized, operates the classifying means to direct properly-sized particulate material into the hopper section of the metering feed device. The pressure responsive sensing means energizes the control circuit when the particulate material in the hopper section of the metering feed device is below a predetermined amount, and de-energizes the control circuit when said predetermined amount of particulate material is disposed within the hopper section.

Reference to "pressure responsive sensing means" throughout this application refers to all sensing means which are operated by the pressure, weight, and/or force of the particulate material within the metering feed device. Exemplary pressure reponsive sensing means are weight detectors which either energize, or de-energize the control circuit predicated on the weight of particulate material within the metering feed device, and level sensing devices which include a member directly engagable by the particulate material within the metering feed device to be moved between a control circuit energizing position and a control circuit de-energizing position.

It is extremely important in this invention that a pressure responsive sensing means be utilized to detect the amount of particulate material within the hopper section of the metering feed device. Other sensing means, such as photocells, will not operate reliably in the feed system of applicant's invention. If a photocell were positioned on the metering feed device at a level corresponding to the predetermined level of particulate material which is to be maintained in the hopper section, the particulate material would coat the lens to prevent detection of a change in light intensity when the particulate material fell below said predetermined level. Therefore, the photocell will not operate effectively to energize the control circuit for controlling the classifying means when the level of particulate material in the hopper section falls below a desired level.

The level of particulate material maintained in the hopper section of the metering feed device is limited to an amount which will prevent the agglomeration of the particulate material into oversized particles prior to the particulate material being fed into a gaseous medium within the delivery conduit means. This amount of particulate material will vary depending on the particular material utilized, and easily can be determined by people skilled in the art by empirical testing. The problem of agglomeration of particulate material into oversized particles is most prevalent when the particulate material has a high moisture content, since the high moisture content tends to encourage a combination, or agglomeration of the particulate material into said oversized particles.

In the preferred embodiment of this invention, the metering feed device includes a housing which is divided into the hopper section and the trough section, and a vibratory unit for vibrating the housing to feed the particulate material from the hopper section through the trough section into a gaseous medium. The vibratory unit also tends to prevent the agglomeration of particulate material as said material is directed through the trough section into the gaseous medium. The combined weight of the housing and the particulate material contained therein is substantially unvarying during operation of applicant's feeding system since the amount of particulate material in the housing is maintained at a substantially constant level by the pressure responsive sensing means. By maintaining a substantially constant weight of the vibrating elements, variations in the amplitude of vibration are eliminated which results in an extremely reliable control over the volumeric rate of feed of the particulate material through the housing of the metering feed device.

In the most preferred embodiment of the invention, the housing includes an adjustable gate means separating the hopper section from the trough section, and this gate means is adjusted to regulate the level of particulate material passing into the trough section from the hopper section. Since the particulate material is maintained in the hopper section at a level which will inhibit the agglomeration of properly-sized particulate material into oversized particulate material, the density of particulate material in the hopper section will be substantially uniform throughout. By controlling the level, or height of the uniform density particulate material directed from the hopper section into the trough section, an extremely reliable control of the volume of particulate material fed into the trough section is achieved.

In the most preferred embodiment of this invention, the trough section of the metering feed means is provided with a plurality of transversely spaced, elongate partitions extending substantially the entire extent of the trough section for dividing the trough section into separate channels. All of the channels are of substantially the same dimension when a uniform particulate layer is to be formed on a substrate surface. By extending the partitions for substantially the entire extent of the trough section, the particulate material is immediately directed into the separate channels as it passes through the gate means to provide a uniform volumetric distribution of particulate material within the channels. A nonuniform volumetric distribution of particulate material within the channels could occur if the partitions were spaced from the gate means, by a transverse shifting of particulate material within the trough section prior to said partciulate material reaching the channels defined by said partitions.

Each spray means of this invention includes a spray nozzle, and a delivery conduit is associated with each channel in the trough section of the metering feed device with a corresponding spray nozzle of each spray means. A gaseous medium, such as air, is directed through each delivery conduit, and each delivery conduit includes a restrictive passage therein in communication with a respective channel of the trough section to create a partial vacuum when the gaseous medium is directed therethrough to pull the particulate, thermoplastic material into the gaseous medium to form a gaseous suspension of particulate material which is fed to each spray nozzle.

In order to form substantially uniform layer of particulate material on a substrate, the volume of particulate material fed into the gaseous medium must be substantially uniform throughout the entire powder deposition operation. The feed system of this invention has proven extremely reliable in controlling the volume of particulate material directed into the gaseous medium to thereby aid in the formation of a substantially uniform layer of particulate material on a substrate surface.

Applicant has discovered that the movement of a gaseous suspension of particulate material through each delivery conduit and its associated spray nozzle tends to cause a build-up of electrostatic charges on the particulate material and on the walls of the delivery conduit. As these changes build up, the position of the particulate material within the gaseous suspension changes in an erratic, unpredictable fashion, to cause variations in the volume of particulate material distributed throughout the gaseous medium. Unless sufficient mixing action is provided for the gaseous suspension of particulate material, these variations in the volume of particulate material in the gaseous medium will be manifested in the formation of a non-uniform layer of particulate material on a substrate surface. The formation of non-uniform layers of particulate material on a substrate surface can result in a high rejection rate when close tolerances are required.

Applicant's invention further resides in a unique spray means which aids in mixing the gaseous suspension of particulate material to establish a substantially uniform dispersion of particulate material throughout the gaseous medium. The spray means of this invention includes a unique spray nozzle and a unique deflecting fan. The spray nozzle of this invention includes an elongate, hollow body member having an elongate passage extending at least partially therethrough and terminating at a downstream end in an exit orifice. An inlet port extends through the side wall of the hollow body member and is in communication with the elongate passage therein. The inlet port has an axis which is substantially transverse to the direction of elongation of the elongate passage. A baffle section cooperates with the hollow body member to define an entrance chamber of the elongate passage. The baffle section has a continuous surface tapering in the downstream direction of the elongate passage and is disposed in overlying relationship with the inlet port extending through the wide wall of the hollow body member. A gaseous suspension of particulate, thermoplastic material is connected by a suitable conduit to the inlet port of the spray nozzle to direct the gaseous suspension into the spray nozzle at substantially a right angle to the elongate passage. As the gaseous suspension is directed through the entrance port it will swirl about the baffle section and be subjected to a vigorous mixing action within the entrance chamber to uniformly disperse the particulate material throughout the gaseous medium. In addition, the tapering configuration of the baffle section imposes a component of force on the gaseous suspension in the downstream direction of the elongate passage to aid in directing the gaseous suspension through the exit orifice of said elongate passage. The positional relationship of the inlet port with the entrance chamber of the elongate passage provides an extremely reliable and controlled mixing of the gaseous suspension of particulate material to correct for any uneven distribution of particulate material in the gaseous medium resulting from the electrostatic buildup of charges on the particulate material and on the walls of a delivery conduit as the gaseous suspension of particulate material is conveyed through the delivery conduit to a spray nozzle. In the most preferred embodiment of the spray nozzle of this invention, a discharge outlet chamber is in continuous communication with the entrance chamber and extends in a downstream direction to terminate in the exit orifice of said elongate passage; the entrance chamber and discharge outlet chamber defining the elongate passage through the spray nozzle. The discharge outlet chamber has a larger cross sectional area at its upstream end, where it joins said entrance chamber, than at its downstream end defining said exit orifice. The upstream end of the discharge outlet chamber includes a continuous inclined surface converging in a downstream direction to direct and confine the flow pattern of the gaseous suspension of particulate material through the discharge outlet chamber and out of the exit orifice.

The spray means further includes a deflector fan associated with each spray nozzle for deflecting the confined, gaseous suspension of particulate material exiting from the exit orifice of said spray nozzle. The deflector fan includes a deflecting and spreading section inclined in a downstream direction from the exit orifice of the spray nozzle and disposed in overlying relationship with said exit orifice for receiving the direct impingement of the confined, gaseous suspension of particulate material exiting from the exit orifice. The gaseous suspension of particulate material impinged against the deflecting and spreading section is deflected out of its general direction of travel through the exit orifice, and is spread into an oval, or elliptical pattern having its major axis substantially perpendicular to the axis of the exit orifice of the spray nozzle. the deflector fan further includes a second section integrally formed with, and extending from the deflecting and spreading section. This second section further deflects the gaseous suspension of particulate material. When the spray means is employed in an electrostatic deposition system the second section ionizes the particulate material within the gaseous suspension as the gaseous suspension is directed past an exposed outer knife edge of said second section. The exposed outer knife edge preferably extends through an arc of approximately 180°, and a high voltage power supply is electrically connected to the spray nozzle to form a high-field gradient around the knife edge to provide extremely uniform ionization of the particulate material within the gaseous suspension as said gaseous suspension passes said knife edge.

According to a further aspect of this invention, a belt supports a plurality of spray means and moves through a path, at least a portion of which traverses past a surface of a substrate upon which a layer of particulate material is to be formed. Preferably, the belt supporting the plurality of spray means moves through a path defining a closed loop which is defined in part by a pair of spaced, linear runs, both of which traverse past the substrate surface for directing the plurality of spray means past said substrate surface twice in each complete revolution of the belt. The elongate passage through each spray nozzle preferably is disposed substantially parallel to the substrate surface upon which the layer of particulate material is to be formed. Preferably, this elongate passage is disposed in substantially the same direction of travel as the spaced, linear runs of the belt supporting the spray means. The belt turns about spaced pulleys which are disposed beyond side margins of the substrate surface upon which the layer of particulate material is to be formed. In this manner, the particulate material is applied on the substrate surface only by spray means on the spaced, linear runs. This arrangement has provided for accurate control in forming a substantially uniform layer on the substrate surface.

In the preferred embodiment of this invention, the substrate surface is directed by a conveyor in a first direction, and the spaced, linear runs of the belt supporting the spray means traverse past the substrate surface upon which the layer is to be formed at an angle of from about 90° to about 45° to the direction of travel of the substrate. The deflector fan directs the gaseous suspension of particulate material exiting from the exit orifice of the spray nozzle at an angle of approximately 90° onto the substrate surface, and the oval, or elliptical patterns of particulate material from the spray means are deposited in overlapping relationship with each other on the substrate surface with the major axis of each oval disposed substantially perpendicular to the axis of the exit orifice of the spray nozzle. Therefore, the longest dimension of the elliptical pattern, i.e. the dimension along the major axis of the elliptical pattern, will vary from a position substantially parallel to the direction of feed of the substrate to a position at 45° to the direction of feed of the substrate depending upon the angular relationship between the spaced, linear runs of the belt supporting the plurality of spray means and the direction of feed of the substrate.

The relationship between the direction of feed of the substrate, the direction of feed of the spray means, the disposition of the spray means relative to the substrate surface and the specific pattern of the gaseous suspension of particulate material formed by the deflector fan of each spray means has proven extremely reliable in aiding in the formation of a substantially uniform and continuous layer of particulate material on a substrate surface, especially on an extensive substrate surface, such as the surface of a release paper substrate.

This invention also relates to a unique structural relationship between the metering feed means and the spray means to permit continuous movement of the belt supporting the spray means through a closed loop. The metering feed device is mounted on a rotatable platform, and each delivery conduit is in communication with the metering feed device and one of the spray means which is supported on the belt. A drive means is provided for rotating the platform and the belt in synchronism to prevent entanglement of the delivery conduits extending from the metering feed device to the spray means. In the most preferred embodiment of this invention, each spray means extends through a lower rotatable section of a housing in which the spray-means-supporting belt is mounted, and the drive means is effective to rotate the lower rotatable portion of the housing in synchronism with the platform supporting the metering feed device and the spray-means-supporting belt to provide a guide for the delivery conduits extending from the metering feed device to each spray means. In the most preferred embodiment of the invention, the rotatable platform, the lower housing section and the spray means supporting belt are synchronized to rotate through a complete 360° revolution in the same period of time to prevent twisting and entanglement of the delivery conduits.

It is a general object of this invention to provide a substantially uniform and continuous particulate layer on a substrate surface.

It is a specific object of this invention to positively control the volumetric rate of feed of particulate, thermoplastic material into a gaseous medium to form a gaseous suspension of said particulate material.

It is a further specific object of this invention to provide sufficient mixing action for a gaseous suspension of particulate material to provide a substantially uniform concentration of said particulate material in a gaseous suspension directed onto a substrate surface.

Other objects and advantages of this invention will become apparent upon considering the detailed description which follows, taken in conjunction with the drawings.

DESCRIPTION OF THE PREFERRED EMBODIMENT OF THIS INVENTION

Figure 1:
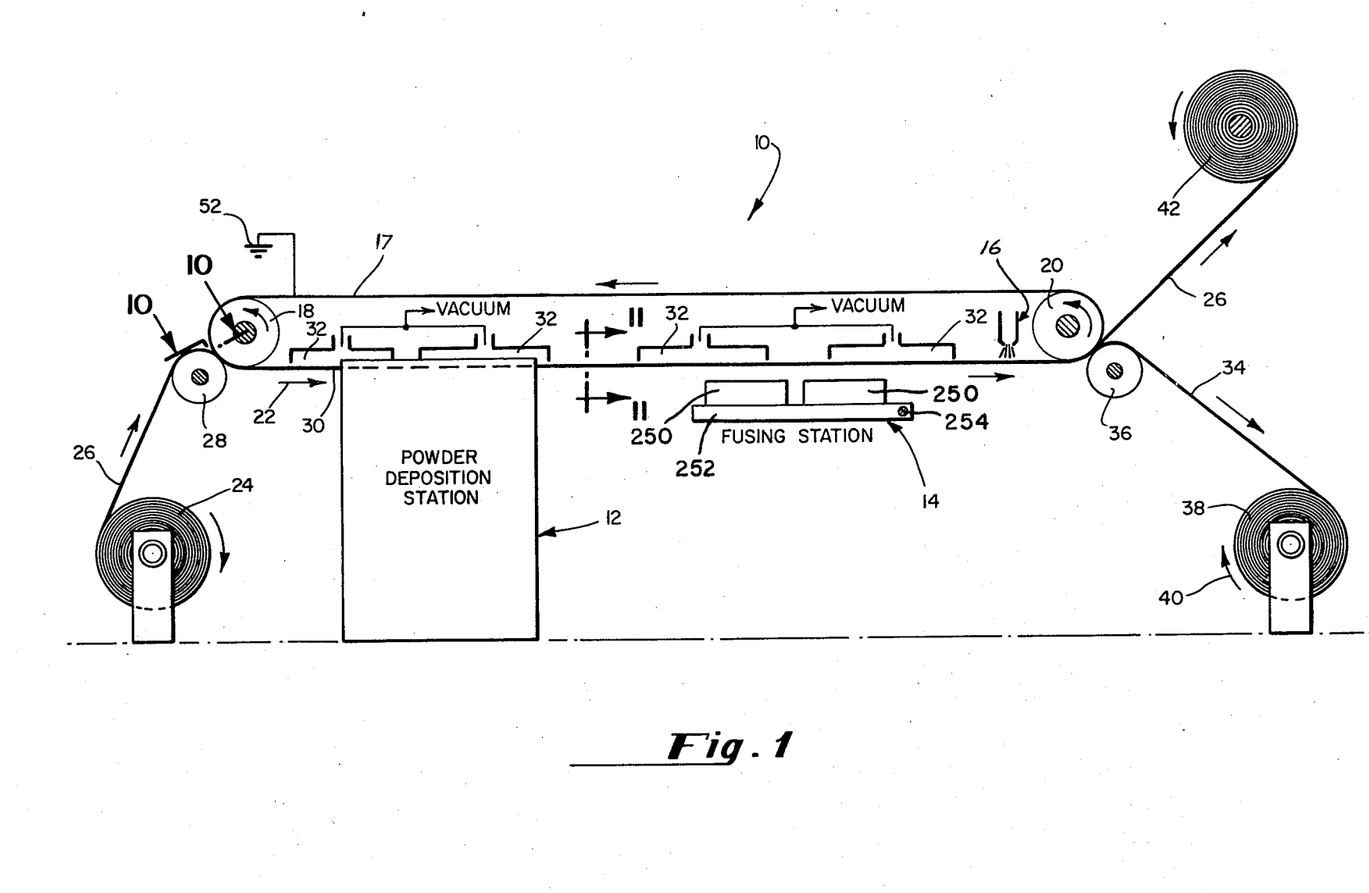
FIG. 1 is a schematic view, in elevation, of a powder deposition system of this invention.

Referring to FIG. 1, an electrostatic powder deposition system 10 includes a powder deposition 12, a powder fusing station 14 and a cooling station 16. The powder deposition station 12 of this invention applied a substantially uniform and continuous layer of particulate material onto a substrate surface from a gaseous suspension of particulate, thermoplastic polymeric material.

Any particulate, thermoplastic material which can be applied to a substrate in a gaseous medium, and which is capable of being fused into a substantially continuous film or layer upon heating to its fusion temperature, can be applied to a substrate surface according to the method and apparatus of this invention. Preferably these materials are polymers, such as polyethylene, polypropylene, compounded dry-blended poly (vinyl chloride), certain polyurethanes, polystyrene, poly (methyl methacrylate) homo- and copolymers, cellulose acetate, butyrate and propionate, certain nylons, and the like.

Referring to FIG. 1, the electrostatic, powder deposition system 10 of this invention includes an endless conveyor 17 for supporting a substrate upon which a web of particulate material is to be formed. The endless conveyor 17 is trained about spaced rolls, or pulleys 18 and 20, and one of these rolls is driven by conventional drive means (not shown) to drive the endless conveyor 16 in the direction indicated by arrow 22. A roll 24 of a substrate 26, such as release paper, is directed over a guide roll 28 into engagement with a coating run 30 of the endless conveyor 16. The substrate 26 is held against the lower surface of the coating run 30 by vacuum shoes 32 which are connected to a source of vacuum (not shown) to assure positive control of the speed, and position of travel of the substrate past the powder deposition station 12, the fusing station 14 and the cooling station 16. A uniform layer 33 of particulate material (FIG. 11) is electrostatically deposited on the lower surface of the substrate 26 as said lower surface is conveyed past the powder deposition station 12. The layer 33 is fused into a substantially continuous fused web 34 at the fusing station 14 and is cooled at the cooling station 16. When the substrate 26 is of the release-type, the cooled web 34 is removed therefrom at a take-off roll 36 which is disposed at the downstream end of the coating run 30. The fused web 34 of particulate material is directed from the take-off roll 36 to a storage roll 38 which is positively driven by conventional drive means (not shown) in the direction indicated by arrow 40. The substrate 26 is directed to a positively driven rewind roll 42 for storage and/or subsequent use. The electrostatic, powder deposition system 10 of this invention can be provided with a plurality of alternating powder deposition stations 12 and fusing stations 14 to permit the sequential lamination of fused webs of the same, or different, particulate, thermoplastic material.

The endless conveyor 17 for supporting the substrate 26 preferably is of the type invented by Lennox Brickhead, Jr., Charles P. Evans and Alden W. Olsen, and covered in U.S. Pat. No. 3,745,846, titled CONVEYOR BELT CONSTRUCTION. Referring to FIGS. 1 and 9–11, the structure of the endless conveyor 17 will be described for purposes of completeness. The endless conveyor 17 is in the form of a continuous composite belt comprising a conductive supporting member 44, which is preferably stainless steel, a porous insulating pad 46 disposed adjacent one surface of the supporting member 44 and a pair of longitudinally extending sealing strips 48 cemented at 50 adjacent each elongate edge of the supporting member 44. The supporting member 44 is relatively rigid under tension, to prevent distortion of said conveyor belt under the tension forces applied thereto by the spaced rolls, or pulleys 18 and 20. When the conveyor 16 is utilized in the electrostatic powder deposition system 10, the supporting member is grounded at 52 (FIG. 1). The porous insulating pad 46 can be made of any suitable insulating material which is stable under the temperature conditions employed in the powder deposition and fusion process, i.e., will not melt or flow at such temperatures. Preferably, such materials have a conductivity factor on the order of about 0.01 to about 0.1 BTU/(hr.) (sq. ft.) (°F/ft.) at the temperature conditions employed during the fusing operation, and include such materials as asbestos, glass wool and Teflon and Nylon felts. In the preferred embodiment, a high-temperature porous Nylon pad is utilized which is sold under the trademark "Nomex" by E. I. DuPont Company. The sealing strips 48 can be of any suitable material which remains stable at the temperatures employed during the powder deposition and fusion process, and in the preferred embodiment of this invention is a silicone rubber.

Figure 9:
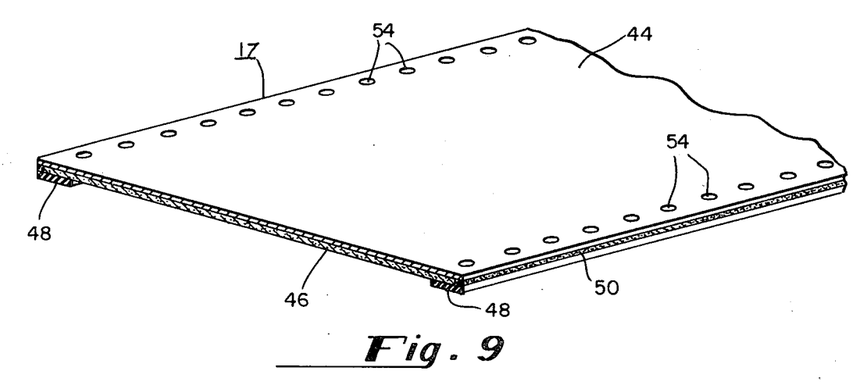
FIG. 9 is a fragmentary dimetric view of the substrate conveyor belt.

Vacuum ports 54 are disposed adjacent each longitudinal edge of the supporting member 44, and a vacuum is applied through the ports by the vacuum shoes 32 which are fixed against movement to suitable frame members (not shown). In operation, the supporting member 44 is fed in sliding engagement with the vacuum shoes 32 along the coating run 30 so that a vacuum is continuously applied through the vacuum ports 54, and therefore, through the porous insulating pad 46 to retain the substrate 26 in intimate, uniform contact with said insulating pad.

Figure 10:
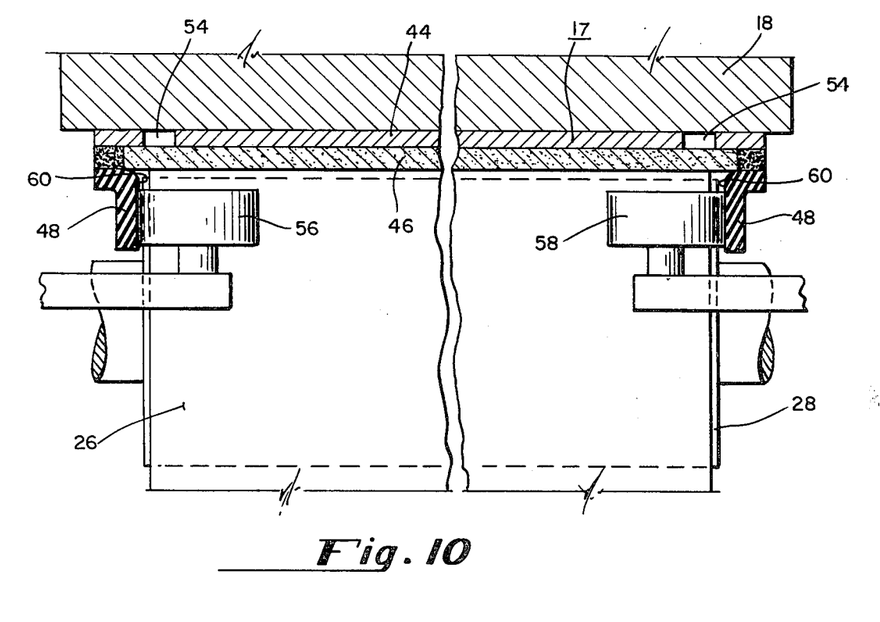
FIG. 10 is a sectional view along line 10—10 of FIG. 1.
Figure 11:
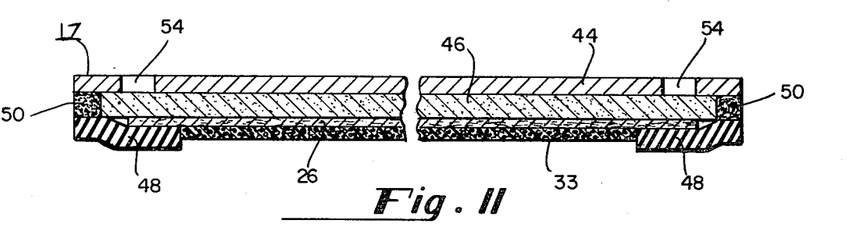
FIG. 11 is a sectional view along line 11—11 of FIG. 1.

Referring to FIGS. 1, 10 and 11, a pair of rollers 56 and 58 are disposed adjacent the roll 28 at the upstream end of the endless conveyor 17. The silicone rubber sealing strips 48 are peeled back from the insulating pad 46 and are disposed about the peripheral surface of each roll to permit the substrate 26 to be fed against the insulating pad 46 with end margins of said substrate disposed between said insulating pad and inner surfaces 60 of the silicone rubber sealing strips 48 as the endless conveyor 17 moves past roll 28. As the sealing strips 48 pass rollers 56 and 58 in the direction indicated by arrow 22 in FIG. 1, they return to their normally closed position to seal the end margins of the substrate 26. Therefore, the sealing strips 48 provide a closed system in which a sufficient vacuum is maintained through the insulating pad 46 to firmly, but gently, hold the substrate 26 against said insulating pad. In addition, the sealing strips 48 protect the end margins of the substrate 26 to prevent them from drying out and cracking during the fusing operation.

The endless conveyor 17 provides a firm, uniform support for the substrate 26 against the insulating pad 46 to permit the feeding of the substrate at a controlled speed and at a substantially unvarying spacing past the powder deposition station 12, the fusing station 14 and the cooling station 16 to permit accurate control over the web forming process.

Figures 2, 3, 4:
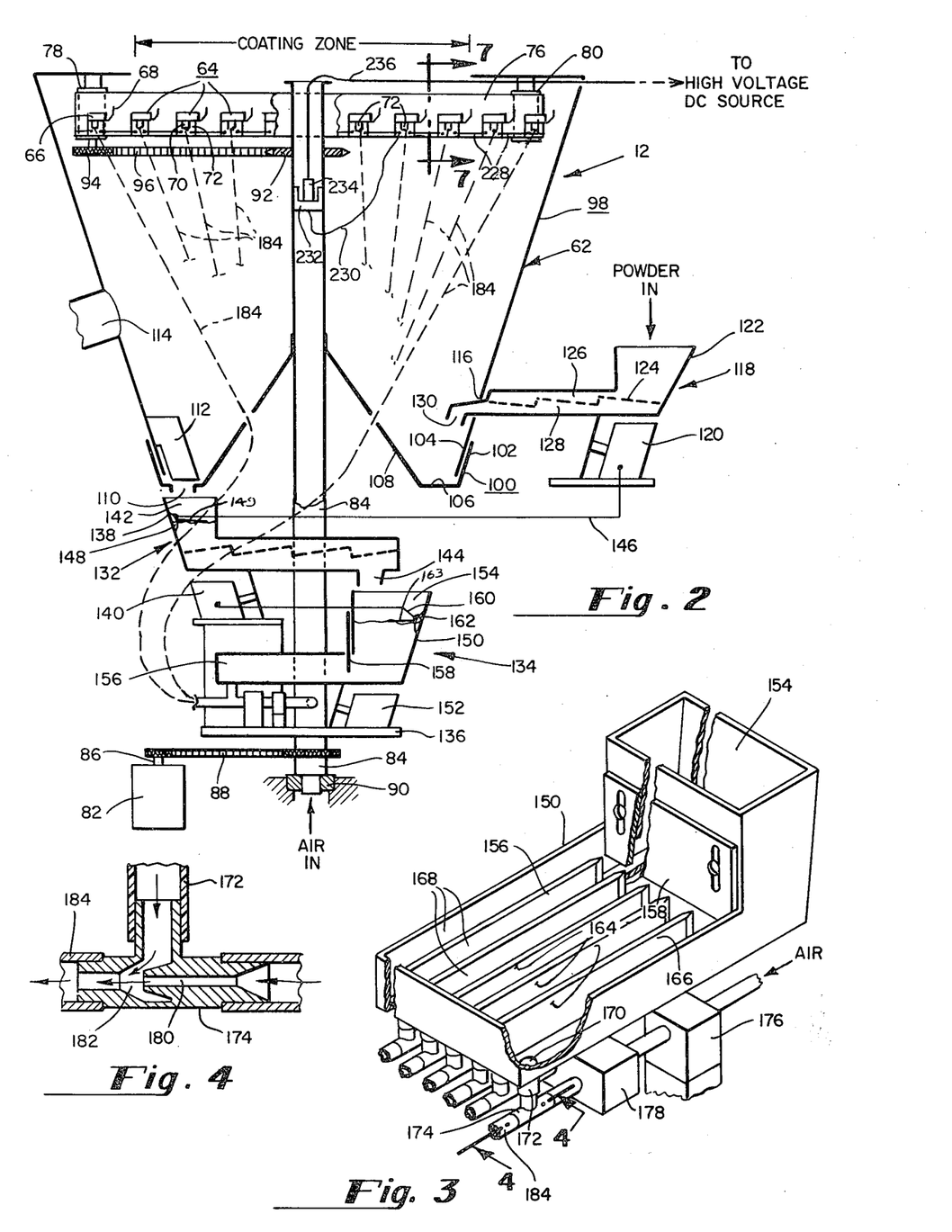
FIG. 2 is a schematic vertical sectional view of the powder deposition station.
FIG. 3 is an isomeric view of a metering feed device utilized in this invention.
FIG. 4 is a section along line 4—4 of FIG. 3.
Figure 5:
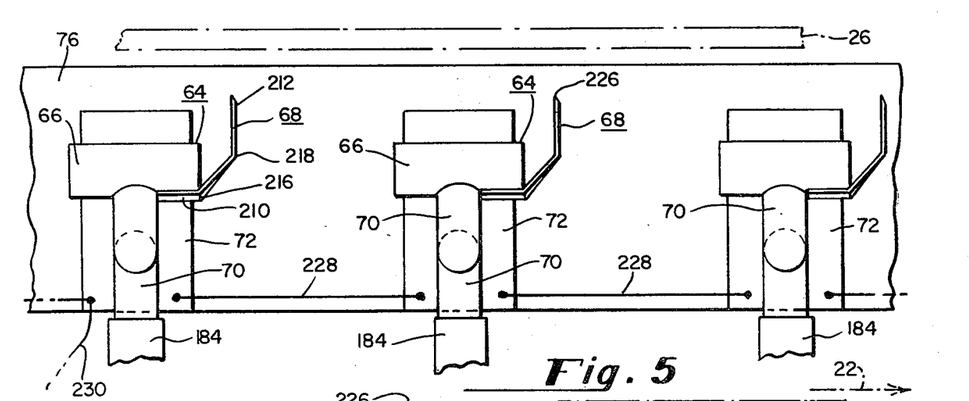
FIG. 5 is a fragmentary side elevation view of a plurality of spray means of this invention, showing the manner in which they are secured to a timing belt.
Figure 7:
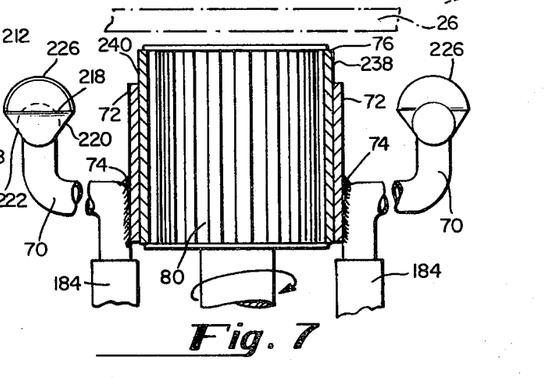
FIG. 7 is a sectional view along line 7—7 of FIG. 5.

Referring to FIGS. 2, 5 and 7, the powder deposition station 12 of this invention includes a powder feed and spray chamber 62 in which a plurality of spray means 64 are positioned. Each spray means 64 includes a spray nozzle 66 and a deflector fan 68, details of which will be described hereinafter. Each spray nozzle 66 has a hollow inlet arm 70 secured to an electrically conductive plate 72 by an electrically conductive joint 74, such as welded, or soldered joint to provide an electrically conductive path from the spray nozzle to the conductive plate 72. The conductive plate 72 is secured to an endless conveyor, or timing belt 76 by any suitable means, such as bolts, adhesive, or the like. The timing belt 76 is trained about a pair of transversely spaced pulleys 78 and 80. One of the pulleys 78 is driven by any suitable drive means, such as a variable speed motor 82. The motor 82 rotates a vertically extending hollow main shaft 84 through a motor output shaft 86 which is operably connected to the main shaft 84 through a drive chain 88. The main shaft 84 is mounted for rotation in a conventional bearing mount 90. A pulley drive sprocket 92 is secured to the main shaft 84 to rotate therewith. The pulley drive sprocket 92 is transversely aligned with a second, driven sprocket 94 which is secured to the axle of the pulley 78. The sprockets 92 and 94 are connected by an endless drive chain 96, whereby rotation of the main shaft 84 by the variable speed motor 82 positively drives the pulley 78 to thereby drive the timing belt 76 and the spray means 64 secured thereto in a path defining a closed loop.

Referring to FIG. 2, the powder feed and spray chamber 62 includes an upper housing section 98, which is mounted against rotation to suitable supporting structure (not shown), and a lower housing section 100 which is secured to the main shaft 84 to rotate therewith. The lower housing section 100 includes a peripheral side wall 102 which extends outwardly of, and overlaps a peripheral side wall 104 of the stationary upper housing section 98 to prevent the escape of particulate material from the powder feed and spray chamber 62. The rotatably mounted, lower housing section 100 further includes a substantially continuous peripheral bottom wall 106 and an inner conical section 108 secured at one end to the main shaft 84 and integrally formed at its opposite end with said bottom wall 106. The peripheral bottom wall 106 has a funnel-shaped opening 110 extending therethrough. A plurality of doctor blades 112, only one of which is shown in FIG. 2, are secured about the periphery of the stationary upper housing section 93 and have a lower edge positioned close to the peripheral bottom wall 106 of the rotatably mounted lower housing section 100 to direct particulate material into the funnel-shaped opening 110 as the lower housing section 100 rotates with the main shaft 84. A slight vacuum is maintained in the powder feed and spray chamber 62 by a suitable vacuum source (not shown) through opening 114. This application of vacuum tends to draw a slight amount of particulate material through opening 114, but primarily functions to maintain a pressure differential between the atmosphere and chamber 62 to prevent the escape from within the chamber 62 of particulate material which does not adhere to the substrate surface. A cyclone separator (not shown) can be associated with opening 114 to separate particulate material from the gaseous suspension of said material which passes through opening 114, and to return the separated material to the chamber 62.

Particulate, thermoplastic material is fed into the powder feed and spray chamber 62 through an opening 116 in the stationary upper housing section 98 by a powder pre-screener or classifying device 118. The powder pre-screener 118 includes a vibratory unit 120, and a housing 122. The vibratory unit 120 can be of any conventional design, but preferably is one having a variable amplitude magnetic drive, such as is sold by Syntron, a division of FMC Corporation, Homer City, Pennsylvania, under Model No. F-T01-A. The pre-screener 118 is utilized to both feed particulate material into the feed and spray chamber 62, and to blend said particulate material with other materials, when desired. The housing 122 is divided by a screen 124 into an upper section 126 and a lower section 128. Oversized particles, or agglomerates of particulate material which behave as projectiles to inhibit the formation of substantially continuous layers of particulate material on a substrate surface will not pass through the screen and are fed from the upper section 126 of the housing 122 into a suitable storage chamber (not shown). Alternatively, these oversized particles can be continuously cycled through any suitable screening device (not shown) for processing into smaller, properly-sized particles from which substantially continuous layers of particulate material can be formed on a substrate surface. Properly-sized particulate material which can be sprayed onto a substrate to form a uniform layer thereon is directed through the screen 124 into the lower section 128, and is fed into the powder feed and spray chamber 62 through an opening 130 of the housing 122 of the pre-screener 118.

A classifying means 132 and a metering feed means 134 are both mounted on a platform 136, and this platform is fixedly secured to the main shaft 84 to rotate therewith. Therefore, the platform 13 will rotate through a complete revolution in the same time as the lower housing section 100 of the feed and spray chamber 62 rotates through a complete revolution.

The classifying means 132 includes a housing 138 and a vibratory unit 140 upon which said housing 138 is mounted. The housing 138 may be identical to the housing 122 of the pre-screener 118, and includes a funnel-shaped entrance chamber 142 at the upstream end thereof. The funnel-shaped entrance chamber 142 is in alignment with the funnel-shaped opening 110 in the peripheral bottom wall 106 of the lower housing section 100, and will be maintained in alignment therewith as a result of the common rotative mounting of the lower housing section 100 and the platform 136 to the main shaft 84. Therefore, the particulate material fed into the powder feed and spray chamber 62 will be directed by the doctor blades 112 through the funnel-shaped opening 110 into the funnel-shaped entrance chamber 142 of the housing 138 on the classifying means 132. The classifying means 132 operates in the same manner as the pre-screener 118, and removes all oversized particulate and foreign material from the supply of particulate material received from chamber 62. Properly-sized particulate material from which a substantially uniform layer can be deposited on a substrate surface is directed through a funnel-shaped opening 144 disposed in the bottom wall of the housing 138. The vibratory unit 140, can be of any conventional design, and preferably is a variable amplitude unit which is the same as the vibratory unit 120 of the pre-screener 118. The vibratory unit 120 can be operated to feed particulate, thermoplastic material into the feed and spray chamber 62 through a control circuit 146 which is energized by a pressure responsive sensing means 148 associated with the funnel-shaped entrance chamber 142 of the classifying means. Preferably, the sensing means 148 has an arm 149 extending into the entrance chamber 142 for detecting when the level of particulate material in said entrance chamber is below a predetermined level, and for energizing the control circuit 146 when the particulate material in said entrance chamber 142 is below said predetermined level. Energizing the control circuit 146 will energize the vibratory unit 120 of the pre-screener 118 to feed additional particulate material into the feed and spray chamber 62 from where it is directed into the entrance chamber 142 of the classifying means through opening 110 in the bottom wall of said feed and spray chamber.

Referring to FIGS. 2 and 3, the metering feed device 134 includes a housing 150 and a vibratory unit 152. The vibratory unit 152 can be of any conventional design, and preferably is a variable amplitude unit which is the same as the vibratory unit 120 of the pre-screener 118, and the vibratory unit 140 of the classifying means 132. The housing 150 includes a hopper section 154 and a trough section 156 which are separated from each other by an adjustable gate 158. The hopper section 154 is disposed in underlying relationship with the funnel-shaped opening 144 of the classifying means 132. Since the classifying means 132 and the metering feed means 134 are both mounted on the platform 136, the funnel-shaped opening 144 of the classifying means will always be in overlying relationship with the hopper section 154 of the metering feed means 134.

The vibratory unit 140 of the classifying means 132 can be operated to feed particulate, thermoplastic material into the metering feed device 134 through a control circuit 160 which is energized by a pressure responsive sensing means 162 associated with the hopper section 154 of the metering feed device. Preferably the sensing means 162 has an arm 163 extending into the hopper section 154 for detecting when the level of particulate material in said hopper section is below a predetermined level, and for energizing the control circuit 160 when the particulate material in said hopper section is below said predetermined level. Energizing the control circuit 160 will actuate the vibratory unit 140 to cause particulate material to be directed into the hopper section 154 of the housing 150 of the metering feed device 134. In this manner the particulate material is maintained at a substantially uniform, predetermined level within the hopper section 154. The amount of particulate material maintained in the hopper section is limited to prevent agglomeration of particulate material as said particulate material is directed through the housing of the metering feed device. The specific amount of particulate material which will not agglomerate will vary depending upon the material utilized, and easily can be determined empirically by those skilled in the art. By preventing agglomeration of the properly-sized particulate material within the housing 150 of the metering feed device, a substantial uniform density of material is achieved within said housing. Therefore, by maintaining the particulate material in the hopper section 154 at a substantially constant predetermined height, the weight of particulate material in the housing will be maintained substantially constant. Variations in weight of the filled housing can result in variations in the amplitude of vibration of the housing to thereby create undesirable variations in the volumetric rate of feed of the particulate material through the housing 150 of the metering feed device 134. The adjustable gate 158 defines an orifice for regulating the level of particulate material fed into the trough section 156 from the hopper section 154. Since the density of particulate material in the hopper section 154 is substantially uniform, controlling the level of particulate material fed into the trough section controls the volume of said particulate material fed into said trough section. Furthermore, as stated above, since the weight of particulate material is maintained substantially constant, the amplitude of vibration of the housing section 150 of the metering feed means 134 will not vary, and therefore a controlled uniform volumetric rate of feed of particulate material is achieved through the housing 150 of the metering feed means 134 into the trough section.

Referring to FIGS. 3 and 4, the trough section 156 of the housing 150 includes partition means in the form of transversely spaced walls 164 which can be either integrally formed with, or separately secured to bottom wall 166 of said trough section 156. The transversely spaced walls 164 preferably extend for the full length of the trough section to define a plurality of channels 168 in communication with the hopper section for dividing the particulate material into predetermined quantities within the channels as said particulate material is fed from the hopper section 154 through the orifice defined by the adjustable gate 158. The number of channels provided in the trough section of the metering feed means is determined by the number of spray means which are utilized in the powder deposition station. In one embodiment of this invention the trough section is divided into twenty channels for feeding the particulates material in a gaseous suspension to twenty separate spray means 64. When uniform layers are to be formed all of the channels are of the same dimension, and therefore the volume of particulate material in each channel is substantially the same. Each channel 168 has an opening 170 extending completely through the bottom wall 166 thereof. A guide tube 172 extends from each opening and is secured to a venturi member 174. A gaseous medium such as air, is passed through a regulator 176 into each venturi member 174 through a plenum chamber 178 which uniformly distributes the gaseous medium to each of the venturi members 174. The bottom wall and side walls of the trough section, as well as side walls of the partitions are provided with a low friction plastic layer, such as a fluorocarbon, such as Teflon, or a phenolic resin, to provide low friction flow of particulate material through the trough section. This low friction flow aids in providing positive control over the volumetric rate of feed of the particulate material into the gaseous medium throughout the powder deposition operation by preventing powder hand-up on the bottom wall.

Each venturi member 174 has a restrictive channel 180 which opens into an enlarged chamber 182 which is in alignment with a respective guide tube 172 to create a region of partial vacuum in communication with said guide tube when the gaseous medium is passed through the venturi member. This partial vacuum aids in drawing the particulate material through each opening 170 into the venturi member 174 whereat the particulate material is suspended in the gaseous medium. The gaseous suspension of particulate material is fed through individual feed conduits 184 which are connected at one end thereof to the hollow inlet arm 70 of a respective spray means 64 in a manner to be subsequently described. Each feed conduit 184 extends through an opening in the inner conical section 108 of the rotatable lower housing section 100 of the powder feed and spray chamber 62. The rotational motion of the lower housing section 100, the platform 136 and the continuous timing belt 76 are synchronized to prevent the feed conduits 184 for entangling with each other and twisting during the powder deposition operation. Preferably, the housing section 100, the platform 136 and the continuous timing belt rotate through the same number of complete revolutions per minute.

The pre-screener 118 and the classifying means 132 are constructed to remove all oversized particulate matter which act as projectiles to inhibit the formation of substantially continuous particulate layers 33 on a substrate surface, as explained earlier in this application. The size of particulate matter which is oversized will vary, depending upon the thickness of the particulate layer to be deposited on the substrate, and the specific nature of the particulate material being utilized. It is believed that in all cases particulate material above about 200 microns will not adhere to a substrate surface, and will bounce away leaving craters therein to prevent the formation of a substantially continuous layer. For many applications, the particle size should be maintained in the range of from about 5 to about 30 microns, and particles above this size can be removed from a supply of particulate material in successive separating operations by the prescreener 118 and the classifying means 132. If desired, the prescreener can be eliminated, and the complete classifying operation can be accomplished by the classifying means 132.

The powder deposition station 12 of this invention can be provided with a plurality of metering feed device 134 which are mounted on a rotatable platform, and which are provided with particulate material from a single classifying means 132. In this arrangement the classifying means would be mounted in a fixed position and would direct particulate material into each metering feed device 134 as the hopper section thereof passed under opening 144. Conventional pressure responsive sensing means could be utilized to detect the level of particulate material in the hopper section of each metering feed device and to operate the classifying means to feed particulate material into those metering feed devices requiring particulate material.

Figure 6:
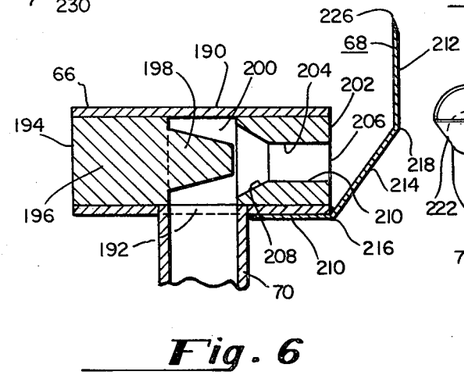
FIG. 6 is an enlarged section through one of the spray means shown in FIG. 5.

Referring to FIGS. 5-7, the spray nozzle 66 of this invention includes a hollow body member 190 to which the inlet arm 70 is secured. The hollow body member 190 defines a cylindrical opening therethrough, and has an inlet port 192 extending through a side wall thereof. The hollow inlet arm is secured to the body member such that the opening of the inlet arm is in communication with the inlet port 192. Each feed conduit 184 is connected at one end to a venturi 174 (FIGS. 3 and 4) and at its opposite end to the inlet arm 70 of a corresponding spray nozzle 66. An insert 194 is disposed in the hollow body member 190 at the upstream end thereof. The insert 194 includes a cylindrical body section 196 and a baffle section 198. The baffle section 192 is an elongate cone and overlies the inlet port 192. The elongate cone cooperates with the inner surface of the hollow body member to define an entrance chamber 200. A second insert 202 is disposed in the hollow body member adjacent the downstream end thereof and defines a discharge outlet chamber 204 in continuous communication with the entrance chamber 200 and terminating at its downstream end in an exit orifice 206. The upstream end of the discharge outlet chamber has a larger cross-sectional area than the exit orifice, and includes a conical surface 208 extending from the upstream end of said discharge outlet chamber in a converging fashion toward the exit orifice. The conical surface terminates in a substantially constant cross-sectional area elongate section 210 of the discharge outlet chamber which extends to the exit orifice 206. Both the insert 194 and the insert 202 are secured within the hollow body member 190 by any suitable means, such as soldering. The gaseous suspension of particulate material entering the body member through the inlet arm 70 will be mixed within the entrance chamber 200 by swirling about the baffle section 198 of the insert 194. This mixing action tends to uniformly distribute the particulate material within the gaseous suspension, and counteracts the non-uniform powder distributing effect of the electrostatic charges which tend to build up on the particulate material and the inner walls of the delivery conduit as the gaseous suspension of particulate material is fed to the spray nozzles. After the gaseous suspension has been mixed within the entrance chamber 200, it is directed past the conical surface 208 of the discharge outlet chamber 204 where it is confined into a substantially uniform cross-sectional suspension which is directed out of the exit orifice 206 and into engagement with the deflector fan 68.

Figure 8:
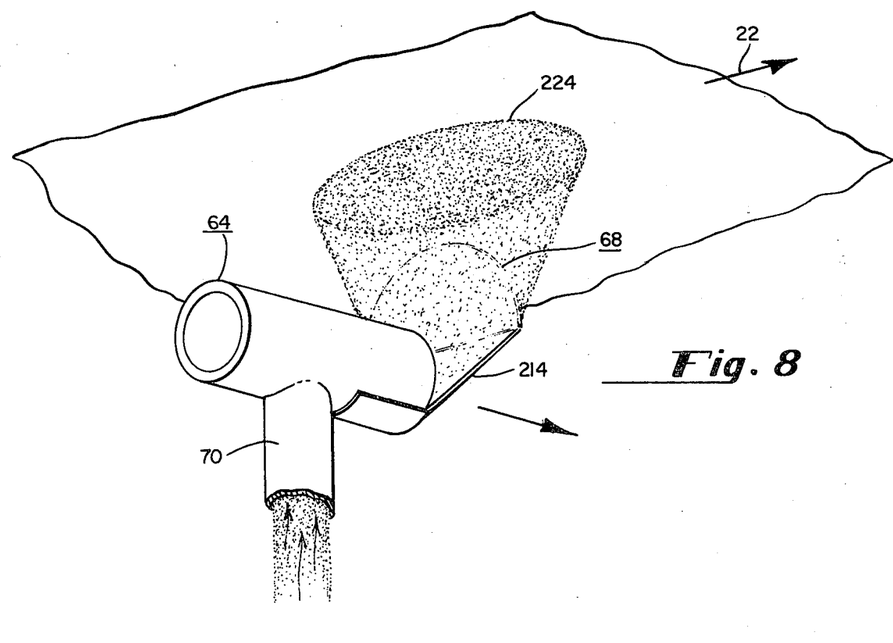
FIG. 8 is an isometric view of a substrate showing the spray pattern deposited according to the preferred embodiment of this invention.

Referring to FIGS. 5-7, the deflector fan 68 of this invention is comprised of a single stamped sheet of chrome-plated steel, or other suitable electrically conductive material. The deflector fan 68 includes a lower connecting section 210 which is secured to the hollow body member 190 of the spray nozzle by any suitable means, such as welding, screws, bolts, or the like. The lower connecting section 210 is connected to an upper, deflecting and ionizing section 212 through an intermediate deflecting and spreading section 214 at transverse bend lines 216 and 218. The deflecting and spreading section 214 is inclined in a downstream direction from the exit orifice, and is disposed in overlying relationship with the entire cross-sectional dimension of the exit orifice 206 for receiving the direct impingement of the confined, gaseous suspension of particulate material exiting from said exit orifice. The deflecting and spreading section 214 preferably is disposed at an angle of from about 115° to about 155, to an axis of the exit orifice. Preferably the deflecting and spreading section 214 is disposed at an angle of about 135° to the axis of the exit orifice. The deflecting and spreading section 214 includes diverging side margins 220 and 222 which terminate at transverse bend line 218 to define a diverging planar surface for spreading the gaseous suspension of particulate material into a substantially oval, or elliptical pattern 224 as shown in FIG. 8. In addition to the spreading function, the deflecting and spreading section deflects the gaseous suspension of particulate material to provide an additional mixing action of said gaseous suspension. The upper deflecting and ionizing section 212 is disposed at substantially right angles to the axis of the exit orifice of the spray nozzle and engages the gaseous suspension of particulate material after it has been deflected and spread by the deflecting and spreading section 214 to further deflect the gaseous suspension. The deflecting and ionizing section terminals in a substantially arcuate upper knife edge 226 which extends, in the preferred embodiment, along an arc of substantially 180°. The knife edge 226 is adapted to receive a high electric field gradient therearound for ionizing the particulate material in the gaseous suspension as said gaseous suspension is directed past the knife edge when each spray means 64 is utilized in the electrostatic powder deposition system 10 of this invention. When the spray means 64 are utilized in electrostatic powder deposition system 10 of this invention the conductive plates 72, to which the inlet arms 70 of each of the spray nozzles 66 are secured, are electrically connected by conductive wires 228 to thereby provide a conductive path among all of the spray means 64. A high voltage lead 230 of known construction is secured to one of the conductive plates 72 and extends through an opening in the hollow main shaft 84 where it is secured to a female connector 232 fixedly secured to the inner walls of the main shaft. A male connector 234 is maintained in intimate contact with the female connector, and is disposed to rotate relative to said female connector. The male connector has a high voltage lead 236 extending therefrom which is connected to a high voltage DC source (not shown) to thereby complete the electrical circuit to all of the spray means 64. The high voltage DC source can be any conventional source known in the electrostatic art, and preferably is one which puts out either a positive or negative DC voltage of from about 10 to about 100 kilovolts to provide a high field gradient about the knife edge 226 of the deflector fan 68. As explained earlier, the endless conveyor belt 17 is grounded at 52 to provide, in conjunction with the DC voltage source, a voltage gradient between the deflector fan and the release paper substrate 26 to aid in directing and adhering ionized particulate material on a surface of the substrate 26.

Referring to FIGS. 2 and 7, the timing belt 76 has spaced, transversely extending runs 238 and 240 which are driven under the surface of the substrate 26 upon which a layer 33 of particulate material is to be applied in a direction substantially transverse to the direction of movement of the coating run 30 of the endless conveyor 17, as indicated by arrow 22. The transversely extending runs are shown in FIG. 7 as being disposed at substantially a 90° angle to the direction of travel of the substrate 26; however, these transversely spaced runs can be disposed at an angle of from about 90° to about 45° as explained earlier in this specification.

Referring to FIGS. 5, 7 and 8, the spray nozzles 66 are positioned on the timing belt 76 with the axis of each exit orifice disposed substantially parallel to the surface of the substrate 26 upon which the layer 33 of particulate material is to be formed, and in the same direction as the direction of travel of the transversely extending runs 238 and 240 of the timing belt 76. As can be observed in FIG. 8, each spray means 64 directs a substantially elliptical, or oval pattern 224 of the gaseous suspension of particulate material onto the substrate surface, and the major axis of the oval is disposed substantially perpendicular to the axis of the exit orifice of the spray nozzle. Therefore, the major axis of the elliptical pattern will vary from a position substantially parallel to the direction of feed of the substrate, as indicated by arrow 22, to a position at 45° to the direction of feed of the substrate depending upon the angular relationship between transverse runs 238 and 240 of the endless timing belt 76 supporting the plurality of spray means, and the direction of feed of the substrate 26. Applicant has found that the substantially oval pattern 224 provides for extremely efficient, and uniform powder deposition on a surface of paper substrate 26 when the nozzles are disposed relative to the substrate 26 as set forth above. The bending of the gaseous suspension of particulate material by the deflector fan 68, in conjunction with the mixing action of the gaseous suspension within the spray nozzles provides a sufficient mixing action of the gaseous suspension to assure that the particulate material is substantially uniformly distributed throughout the gaseous medium to provide a substantially continuous and uniform layer of particulate material on the substrate surface.

Referring to FIG. 2, the pulleys 78 and 80, about which the timing belt 76 is disposed, are positioned transversely beyond the marginal ends of the coating zone, i.e. transversely beyond the ends of the substrate to be coated. Therefore, the particulate material will not be deposited on a surface of the substrate 26 from the spray means 64 as the spray means turn about the spaced pulleys 78 and 80. The spray means apply the particulate material to the substrate surface only during their transverse paths of travel along the spaced linear runs 238 and 240 of the timing belt. This arrangement of spray nozzles relative to the substrate 26 has been found to provide better control over the powder deposition operation than if the spray means were disposed to apply particulate material to the substrate 26 during their path of travel about the spaced pulleys 78 and 80.

Referring to FIG. 1, the fusing station 14 includes radiant heaters 250 mounted on a support member 252 which can be pivotally adjusted about axis 254 by any conventional mechanical system. The radiant heaters fuse together the particulate matter of the layer 33 to form the self-supporting, substantially uniform and continuous web 34. The precise method of fusing the particulate material together in the layer 33 by heating from only the side of the release paper containing the layer 33 is the invention of Alden W. Olsen and Lennox Birckhead, and is covered in a separate U.S. Pat. No 3,823,209, titled METHOD OF FUSING TOGETHER PARTICULATE, THERMOPLASTIC MATERIAL ON A RELEASE PAPER SUBSTRATE.

After the layer has been fused at fusing station 14 it is directed past a cooling station, which includes a plurality of nozzles (only one being shown in FIG. 1) for directing a cooling medium, such as water, onto the conveyor belt 17 to cool the fused web 34. Other cooling means can be utilized within the purview of this invention, the specific means utilized not forming a part of the instant invention.

Layers of particulate material can be applied to many different substrates utilizing aspects of the method and apparatus of this invention. The substrate can be substantially continuous, or discrete sheets, such as sheets of release paper. One suitable release paper for use in practicing the method and apparatus of this invention is sold under the trademark "Transkote" by S. D. Warren Company, a division of Scott Paper Company. The substrates can be discrete metal molds, or other suitable molds known in the art, having cavities therein for permitting the formation of discrete articles conforming to the configuration of said cavities. The substrate can also be a discrete article, such as a tool handle, upon which a protective layer of fused particulate material is formed. The fused layer is not removed from the article when it is intended to function as a protective coating for such article.

Many different products can be formed according to aspects of the method and apparatus of this invention. For example, the particulate thermoplastic material can be provided with expanding agents to permit the formation of expanded foam polymeric webs which are suitable for use as a substitute for leather in products such as show uppers, upholstery and the like. Fused webs of particulate material can be flocked with fibers such as cotton linters, woodpulp, rayon, and the like to provide a plush, soft material which is suitable for use as a replacement for woven fabrics, such as tablecloths, upholstery and the like. Fused webs can be laminated to suitable fabrics, such as woven, knitted or nonwoven fabrics, to provide a laminated construction which is suitable for use as a textile placement material in garments, interliners and the like. The particulate, thermoplastic material can be combined with fibers prior to being deposited on a substrate surface to permit the formation of a fused web which is reinforced with said fibers. Suitable paper substrates can be coated with a layer of clay and/or resin binders to permit the formation of printing grade papers. Also, discrete flexible and rigid molded articles such as food containers, trays, bottles, and the like, can be formed according to aspects of the method and apparatus of this invention.

Features of the method and apparatus of this invention may be varied depending upon the specific substrate upon which a layer of particulate material is to be formed. For example, when the substrate is a discrete mold, the endless conveyor belt 17 will be replaced by a conveying system suitable for feeding such molds past a powder deposition station. Also, the specific heating system utilized at the fusing station may be varied. For example, in some applications, hot air oven heating may be desirable in place of radiant heaters 250. Also, the arrangement in which the spray means are mounted may be varied. For example, the spray means may be fixed against movement, and the substrate moved past said fixed spray means to form the layer of particulate material on said substrate.

What is claimed is:

1. An apparatus for forming a particulate layer on a substrate surface from a gaseous suspension of particulate, thermoplastic material, said apparatus comprising:
   A. classifying means for removing from a supply of particulate, thermoplastic material substantially all particulate material above a predetermined size which will inhibit the formation of a substantially continuous and uniform layer of particulate material on said substrate surface, and for directing from said supply of particulate, thermoplastic material to a metering feed means properly-sized particulate material from which a substantially continuous and uniform layer of particulate material can be formed on said substrate surface;
   B. metering feed means for feeding said properly-sized particulate material at a controlled volumetric rate to delivery conduit means, said metering feed means including a hopper section at an upstream end thereof and a trough section at a downstream end thereof;
   C. at least one spray means in communication with said delivery conduit means disposed for directing said properly-sized particulate material in a gaseous suspension onto said substrate surface,
      1. movable retaining means to which said spray means are secured, substrate conveying means for conveying said substrate in a first direction and drive means for moving said retaining means along a path, at least a portion of which passes in a second direction substantially transverse to said first direction past the substrate surface upon which said particulate layer is to be formed,
      2. said movable retaining means for said spray means being in the form of a closed loop, said movable retaining means further including a rotatably mounted support member for said metering feed means, and means for rotating said support means and for moving said retaining means through said closed loop in synchronism to prevent twisting of said delivery conduit means,
      3. a housing in which said movable retaining means is disposed, at least a portion of said housing being rotatably mounted, said delivery conduit means extending through said rotatable portion of said housing, said drive means moving said rotatable portion of said housing in synchronism with said retaining means and said support member to prevent twisting of said delivery conduit means;
   D. control circuit means for controlling the operation of said classifying means to direct properly-sized particulate material from said classifying means into said hopper section when said control circuit means is energized; and
   E. pressure responsive sensing means operably associated with said control circuit means for energizing said control circuit means when the particulate material in said hopper section is below a predetermined amount, and for de-energizing said control circuit means when said predetermined amount of properly-sized particulate material is disposed within said hopper section.

2. The apparatus according to claim 1, including partition means associated with the trough section of said metering feed means for defining a plurality of separate channels in said trough section to divide the properly-sized particulate material in said trough section into a predetermined quantity of said particulate material within more than one of said channels, said delivery conduit means including a delivery conduit associated with each of said channels and each delivery conduit being in communication with a separate spray means.

3. The apparatus according to claim 2 wherein at least one delivery conduit further includes vacuum-creating means for creating a region of partial vacuum in communication with at least one of said channels when a gaseous medium is passed through said vacuum-creating means for aiding in drawing said properly-sized particulate material into at least one of said delivery conduit from its respective channels to form a gaseous suspension of said properly-sized particulate material in at least one of said delivery conduit.

* * * * *